United States Patent [19]

Sebastiano et al.

[11] Patent Number: 5,143,796
[45] Date of Patent: Sep. 1, 1992

[54] GLASS WINDSHIELD FOR MOTOR VEHICLES WITH COMBINED CAPABILITIES OF SUN RADIATION SCREEN AND IMAGE COMBINER

[75] Inventors: Francesco Sebastiano, Termoli; Liberto Massarelli, Vasto, both of Italy

[73] Assignee: Societa Italiana Vetro - Siv - S.p.A., San Salvo CH, Italy

[21] Appl. No.: 668,252

[22] Filed: Mar. 12, 1991

[30] Foreign Application Priority Data

Mar. 12, 1990 [IT] Italy ................................ 47742 A/90

[51] Int. Cl.⁵ .............................................. G02B 5/26
[52] U.S. Cl. ................................... 428/623; 428/630; 359/585; 359/609
[58] Field of Search ............... 428/623, 630, 633, 432, 428/434, 433; 296/84.1, 96.19; 340/705; 350/1.6, 1.7, 276 R, 276 SL, 284, 166; 359/360, 589, 585, 609, 601, 613, 614

[56] References Cited

U.S. PATENT DOCUMENTS

| | | |
|---|---|---|
| 3,899,241 | 8/1975 | Malobicky, Jr. ................. 350/174 |
| 4,497,700 | 2/1985 | Groth ................................. 428/426 |
| 4,532,181 | 7/1985 | Brill . | 
| 4,740,780 | 4/1988 | Brown ............................... 340/705 |
| 4,806,904 | 2/1989 | Watanuki .......................... 340/103 |
| 4,943,140 | 7/1991 | Woodward et al. ........... 350/276 R |

FOREIGN PATENT DOCUMENTS

| | | |
|---|---|---|
| 0219273 | 4/1987 | European Pat. Off. . |
| 0229876 | 7/1987 | European Pat. Off. . |
| 0329110 | 8/1989 | European Pat. Off. . |
| 0339274 | 11/1989 | European Pat. Off. . |
| 2550138A | 2/1985 | France ........................ 296/96.19 |
| 9000262 | 1/1990 | PCT Int'l Appl. . |

OTHER PUBLICATIONS

CRC Handbook of Chemistry and Physics; 62nd Edition, 1981–1982, p. E–388.
ASTM, designation E308/85, Standard Method for Computing Colors of Objects by Using the CIE System, 1985, 242–243.
Italian Standard UNI 7885, Dec. 1978.
SPIE, 958 Automotive Displays and Industrial Illumination 30–48 (1988).
Proc. of SID 283(3) 287–290 (1987).

*Primary Examiner*—Michael Lewis
*Assistant Examiner*—Valerie Lund
*Attorney, Agent, or Firm*—Wenderoth, Lind & Ponack

[57] ABSTRACT

A glass article for motor vehicles, in particular a windshield, is provided with a transparent multilayered coating for simultaneously reducing the transmission of incident light energy and combining data relating to driving with the images of the outer environment. The glass article has the following sequence of layers: (glass)/$TiO_2$ or $Al_2O_3$)/($Al_2O_3$ or $SiO_2$)/(Al or Al/Ag or Ag/Al or Ag)/($Al_2O_3$ or $SiO_3$)/($TiO_2$ or $Al_2O_3$). The transparent coating has the capacity of screening solar radiation and sorting information derived from an apparatus of the head-up display type.

3 Claims, No Drawings

GLASS WINDSHIELD FOR MOTOR VEHICLES WITH COMBINED CAPABILITIES OF SUN RADIATION SCREEN AND IMAGE COMBINER

BACKGROUND OF THE INVENTION

1. Field of the Invention

The present invention refers to a glass windshield which has a layer of transparent coating on its surface, providing integrated capabilities as a protective screen against the sun, reducing radiation inside the vehicle, and as an image combiner.

At present, it is possible to see the running state of the vehicle and the driving conditions through the panel of instruments located behind the steering wheel, under the windshield.

However, in order to read the symbols showing the various data, the driver is required to lower his eyes, thus compromising driving safety. A system known in the art as "head-up display" allows the projection and thus the visualization of certain items of control data for the vehicle in the driver's field of vision, superimposed on the external view: This system increases the degree of driving safety.

2. Description of the Prior Art

A head-up display system is formed by four basic parts: a source of bright light, apt to display in various forms, such as numeric, alphanumeric or graphic, the information to be shown to the driver;

an electronic part, formed by a microprocessor system to process data and provide the information to be visualized;

an optical system which carries the beam of light and enlarges and focuses the image at a certain distance from the eyes of the driver;

a combiner which superimposes the image of the driving information on that of the outer environment.

Said parts are assembled and installed on a motor vehicle and constitute an integral part thereof, as does the instrument panel.

Head-up displays are known from the prior art.

In U.S. Pat. No. 4,806,904 to Nissan Motor Co. there is described a head-up display which displays the speed of the vehicle on the windshield. The combiner is a sol-gel mixture of SiO2-TiO2 applied directly on the inside of the windshield, on a restricted area impinged by the light beam emitted from the source. The source of bright light is a numerical display of the VFD (vacuum fluorescent display) type.

U.S. Pat. No. 4,740,780 to Gec Avionics Inc. describes a head-up display capable of displaying numeric, alphanumeric and graphic messages and the combiner is a conventional untreated windshield. The source of bright light is an array of pixels formed by squared gallium phosphide LEDs, which provides a good brightness.

The publication "A holographic head-up display for automotive applications" of Flyght Dynamics Inc. on Proceedings of S.P.I.E. vol. 958 of 1988 describes a head-up display capable of visualizing images on the windshield of a motor vehicle, where the combiner is formed by a volume hologram, transcribed onto dichromate-additioned gelatin on a polyester support, and inserted, after being transcribed, on the windshield under autoclave. The hologram has no optical capacity and functions as a plane mirror. The source of bright light is formed by a halogen tungsten lamp and by a panel of transmitting liquid crystals covered by a solar filter.

European patent application n. 229876 of Yazaki Corporation describes a head-up display which displays standard information necessary to the driver, utilizing the untreated windshield as the combiner. The source of bright light is formed by an incandescence lamp placed behind a panel of transmitting liquid crystals.

The publication "A head-up display for automotive use" on Proceedings of SIB, vol. 28/3 of 1987 of Mitsubishi Electric Corp. describes a head-up display which displays the images on a windshield which has been treated with a thin layer of aluminium, evaporated on the inside surface of the same windshield. The source of bright light is formed by a fluorescent lamp emitting polarized light.

French patent application number 2569863 describes that a small area of a windshield for use in a train or a car can be coated with a $TiO_2$ mono-layer, to obtain a head-up display. The light transmission value in the above mentioned area is stated to be about 55%. As a value of 55% for light transmission through a windshield is far below that required for a satisfactory transmission quality (as a comparison, the EEC standards require a value no lower than 75%), the teaching of this prior art document would appear to be contrary to using a $TiO_2$ mono-layer on the whole surface of a windshield for a head-up display purpose.

German patent application No. 3828137 of Central Glass Co. Ltd. describes a process to form a coating film of $TiO_2$ on a substrate with selected optical reflection characteristics. The $TiO_2$ layer is applied by a chemical process. This involves the obtaining of layers of a thickness ranging from 2900 to 3100 Å. Such thickness does not allow the use of a $TiO_2$ layer on the whole surface of a windshield, as it involves a light transmission value of too low a level.

European Patent application 219273 describes a multi-layer transparent article having a high visibility transmittance. This document is directed to obtaining a sheet of glass having satisfactory luminous transmission characteristics with a coating suitable to an electrically heated windshield. The reflecting characteristics of this glass, however, are apparently depressed by anti-reflective ZnO layers, so that a use of the glass in a head-up display is to be excluded due to insufficient reflective capabilities.

It is furthermore known from the art that, to define the quality of a head-up display, it is necessary to consider principally the optical characteristics of the device and particularly the quality of the image generated by the device.

In more detail, as the quality ratio of an image the parameter $Qr = L_i/L_f$ is defined, where $L_i$ is the brightness of the image and $L_f$ is the brightness of the background, that is of the outer environment. Clearly, the higher this ratio, the higher is the quality of the image, and therefore the higher are the optical characteristics of the head-up display. It is also known that to obtain a good image brightness, that is a high value of $L_i$, one needs not only to have a high value of the source brightness, but also a high reflecting value of the combiner.

It is in fact possible to calculate the value of Qr by the following formula:

$$Q_r = \frac{L_i}{L_f} = D \cdot \frac{T_o}{m^2} \cdot R \cdot \frac{1}{B \cdot T}$$

where D is the luminance of the light source, $m^2$ is the background luminance, $T_o$ is the optical transmission spectrum (except the combiner windshield), m is the total linear enlargement of the optical system, R is the reflection value of the glass, referred to the light incident on the inside of the vehicle with a certain angle of incidence, T is the value of the light transmission referred to the light coming from the outside of the vehicle, with a certain angle of incidence.

A construction of a head-up display for motor vehicles is subjected to the following restrictions. The light transmission of the windshield must not be lower than 75%, according to EEC standards, or 72% under USA standards. The combiner must provide an index of color fidelity of over 90%. A low cost source of light must be used which is compatible with the overall cost of the motor vehicle.

Moreover, it is required that the glass for motor vehicles also serve the purpose of sun screen, both when it is used as a windshield, and when it is used as a rear or side window.

A glass is considered to function as a sun screen when it allows no more than 55% of the perpendicularly incident energy to be transmitted into the cabin.

In view of the contrasting optical requirements and the limitations described above, it is verifiable that, under direct solar radiation, the image results poorly visible due to the relatively low luminance of the source compared to that of the background, as a consequence of the restriction to a light source of a brightness that is neither very strong nor, in particular, very costly. In fact, although sources of light such as cathode tubes (CRT), which are capable of providing a high luminance, are commercially available, their high cost and excessive size are not compatible with the overall cost and dimensions of a motor vehicle.

Moreover, if a sheet of glass, particularly a windshield, is treated to increase its reflectance and therefore improve the luminance of the image, its transmittance of light becomes reduced below 75%, a reduction which is not commercially acceptable.

With the use of a hologram, as explained also in the prior art, there is a risk of low durability, together with the fact that it becomes difficult and costly to insert and assemble said hologram between two double curvature glass sheets.

In any case, from the prior art there does not appear to be any windshield capable of functioning with its entire surface and simultaneously as a sun screen and a combiner for a head-up display. This is nevertheless what would be sought after by motor vehicle manufacturers.

SUMMARY OF THE INVENTION

Object of the present invention is to achieve this result.

This object is achieved by a glass on which a transparent coating has been applied, formed by a one or a plurality of thin layers, chosen and placed in a manner so as to impart to the glass the capability of functioning as both an image combiner and as a sun radiation screen.

It has been surprisingly found that a glass windshield for motor vehicles with combined capabilities of sun radiation screen and image combiner can be obtained when on the whole of one of its surfaces a coating consisting of a $TiO_2$ layer is applied by a cathode sputtering process, the layer having a thickness from about 1200 to 1250 Å.

A similar result can be obtained in a glass windshield comprising on the whole of one of its surfaces a multi-layer coating applied by a cathode sputtering process, said coating including one or two metal layers, said metal being selected from the group consisting of silver and aluminium, with the condition that said metals are different when two metal layers are provided, said metal layer having a thickness in a range from 60 to 300 Å, two inner $Al_2O_3$ or $SiO_2$ layers adjacent to the metal layer(s), each on one side thereof, and two outer $TiO_2$ or $Al_2O_3$ layers each adjacent to one of said inner layers.

In the following description the inner or outer layers will also be indicated collectively as dielectric layers.

The thickness of each of the four dielectric layers can be variable within a range from about 40 to 1500 Å. dielectric layer on one or the other side of the metal layer(s) can have the same thickness. In this case the dielectric layers show a symmetrical arrangement with respect to the metal layer(s).

Preferably at least in one pair of adjacent dielectric layers the thickness range is from 300 to 1500 Angstrom.

DESCRIPTION OF THE PREFERRED EMBODIMENTS

Indicating the four dielectric layers as D1, D2, D3, D4, numbered starting from the first layer placed over the glass substrate, and indicating the metallic layers as M, M1, an embodiment sequence of the coating of the present invention has the material forming D1 being the same as D4 and the material forming D2 being the same as D3 whereas the M layers are placed in the middle between D1 and D2 on one side and D3 and D4 on the other.

In practice, the multi-layered coating presents a combination of the following type: glass-D1-D2-M-D3-D4.

D1 and D4 are selected from $TiO_2$ and $Al_2O_3$.

D2 and D3 are selected from $Al_2O_3$ and $SiO_2$.

However $Al_2O_3$ cannot be selected for both the inner and the outer dielectric layers.

For a laminated windshield, the multi-layered coating is applied on one of the inner surfaces of one of the two glasses which make up the windshield, in particular on one of the surfaces which is in contact with the adhesive. For a windshield formed only by one layer of glass covered by a layer of tear-proof plastic, the coating is applied between the glass and the elastic layer.

The multi-layered coating is applied by a cathode sputtering which allows for low cost and high reliability manufacturing.

The application occurs in successive phases so as to obtain the desired number of layers and thicknesses.

In any case, the number of application phases is not less than the number of layers to be applied.

In an embodiment of the present invention, the coating apt to confer the glass with the functions of image combiner and sun radiation screen is formed by a single layer of appropriate material and thickness.

In this embodiment it has been found that a layer of $TiO_2$ with a preferred thickness of 120 Angstroms used as a coating, is capable of carrying out appropriately the function of image combiner and sun radiation screen.

It has been found that said layer of greater thickness affords a resistance to abrasion and chemical weathering such that it is possible for it to be used directly on an outer surface of the glass, without making it necessary to cover it with another glass or a protective layer.

As a consequence, the function of sun screen is relayed to all windows of the vehicle and, in the case of the windshield, one can advantageously obtain the function of image combiner.

It is evident, in fact, that although such glass is particularly suited to carry out simultaneously both functions, nothing precludes that they be used for just one of the two functions, for example that of a sun screen.

A motor vehicle can therefore advantageously utilize the glass having a single.-layer coat either as a back or side window, or as a windshield, gaining from its capacity of reducing solar irradiation. The eventual introduction in the vehicle of the head-up display will not require substitution of the windshield, as the glass is already capable of functioning as an image combiner.

The characteristics of the invention will become clearer from the description of some of the following examples, which are given only as representative and not as limitative examples.

EXAMPLE 1

A clear glass sheet, produced by the float method, is suitably curved and forms one of the two sheets of a laminated windshield. On either side of said sheet, and specifically the one destined to be in contact with the adhesive layer, preferably in PVB, the following layers are applied in succession by cathode sputtering:

| | |
|---|---|
| $TiO_2$ thickness | 944 Angstroms |
| $Al_2O_3$ thickness | 1378 Angstroms |
| Al | 4 Angstroms |
| Ag | 113 Angstroms |
| $Al_2O_3$ | 40 Angstroms |
| $TiO_2$ | 163 Angstroms |

After having coupled said sheet with another glass sheet using a polyvinyl-butyral adhesive layer, so that the multi-layered coating remains in between, the energy values were measured relative to the light incident from outside with an angle of incidence equal to 0°, the following results were obtained:

| | |
|---|---|
| Light transmission = (Illuminator A) | 76.9% |
| Internal reflection of light = (Illuminant D65) | 11.8% |
| External reflection of light = (Illuminant D65) | 12.5% |
| Energy transmission = (Moon) | 45.6% | and for light incident from inside with an angle of incidence equal to 60° the following results were obtained:

| | |
|---|---|
| Light transmission = (Illuminant D65) | 66.4% |
| Reflection of light = (Illuminant D65) | 21.3% |

The windshield therefore satisfies both the EEC standards, and the requirement of affording a low energy transmission. At the same time the windshield has a good reflection to allow a high value of the ratio $Q_r = L_i/L_f$ which allows the use of the head-up display even under unfavorable conditions.

In particular, for a head-up display formed by: a) a phosphorus VFD light source chosen with a value of brightness equal to 10270 cd/m2; b) an optical system which has an overall linear enlargement equal to 7.4; c) a value of the transmission spectrum of the optics of the entire device (except the windshield-combiner) equal to 0.76; and for a background luminance equal to 10000 cd/m2 and for a windshield with a working angle of 60°, the ratio of Qr is of 0.0046.

EXAMPLE 2

A clear glass sheet, produced by the float method, is suitably curved and comprises one of the two glasses of a laminated windshield.

On the surface of the glass destined to be in contact with the adhesive layer, preferably PVB, the following layers are applied with the known cathode sputtering process:

| | |
|---|---|
| $TiO_2$ thickness | 964 Angstroms |
| $Al_2O_3$ | 1267 Angstroms |
| Ag | 114 Angstroms |
| $Al_2O_3$ | 1267 Angstroms |
| $TiO_2$ | 964 Angstroms |

After having carried out the assembly of the windshield the energy values were measured relative to the light incident from the outside with an angle of incidence equal to 0°, and the following results were obtained:

| | |
|---|---|
| Light transmission = (Illuminant A) | 77.2% |
| Internal reflection of light = (Illuminant D65) | 12.9% |
| External reflection of light = (Illuminant D65) | 13.1% |
| Energy transmission (Moon) = | 43.4% | and for light incident from the inside with an angle of incidence equal to 60° the following results were obtained:

| | |
|---|---|
| Light transmission = (Illuminant D65) | 64.7% |
| Reflection of light = (Illuminant D65) | 22.9% |

The windshield therefore satisfies both the EEC standards and the requirement of ensuring a low energy transmission from the outside.

The windshield also has a good reflection so as to give a high value to the Qr ratio which, for a head-up display with the same characteristics as given in example 1, and for a windshield with an analogous working angle, is equal to 0.0051.

EXAMPLE 3

A windshield is taken formed by a clear glass with a thickness of 2.4 mm, by an adhesive PVB layer of 0.76 mm and by a green glass with a thickness of 2.4 mm, and has a layer of $TiO_2$ 1200 Angstroms thick deposited with the sputtering method on the last surface destined to remain to the inside of the motor vehicle.

The energy values, for light incident from outside with an angle of incidence equal to 0°, are the following:

| | |
|---|---|
| Light transmission = (Illuminant A) | 76.7% |
| Internal Reflection of light = (Illuminant D65) | 10.9% |
| External reflection of light = (Illuminant D65) | 12.1% |
| Energy Transmission = (Moon) | 52.5% | and for light incident from the inside with an angle of incidence equal to 60° the following results were obtained:

| | |
|---|---|
| Light transmission = (Illuminant A) | 71.8% |
| Reflection of light = (Illuminant D65) | 17.4% |

The windshield therefore satisfies European standards and also ensures a low energy transmission.

At the same time the value $Qr=L_i/L_f$, under working conditions as for example 1, is equal to 0.0035 which is still a suitable value for a good quality image combiner.

EXAMPLE 4

(Comparison)

The same windshield as illustrated in Example 3 was coated with $TiO_2$ layers of various thickness to simulate the conditions described in French patent application No. 2569863.

The following results of light transmission (LT) were obtained:

| $TiO_2$ layer thickness (Angstrom) | LT (%) |
|---|---|
| 1250 | 74.5 |
| 1350 | 69.7 |
| 1450 | 63.8 |
| 1550 | 59 |
| 1650 | 56.3 |
| 1750 | 55.9 |

The results show that a $TiO_2$ layer having a thickness higher than about 1250 Angstrom cannot be used, as the LT value is lower than the minimum allowable.

EXAMPLE 5

(Comparison)

The same windshield as illustrated in Example 3 was coated with $TiO_2$ layers of various thickness to simulate the conditions described on Table 1 in German patent application No. 3828137.

The results are reported in the following table.

| Thickness of $TiO_2$ layer (Angstrom) | LT (%) |
|---|---|
| 2900 | 58.5 |
| 2950 | 58.5 |
| 3000 | 59.5 |
| 3050 | 60.4 |
| 3100 | 61.6 |

The LT values resulting from this test show that the windshield has too low a light transmittance to allow a use thereof on motor vehicles.

In this case the apparent inconsistence of LT values increasing as the layer thickens is explained as an effect produced by optical interference intervening due to the thickness of the $TiO_2$ layer approaching the wavelength of incident light (450-700 nm).

Comparison examples 4 and 5 show that no teaching could be derived from the prior art that a $TiO_2$ monolayer extended to the whole surface of a windshield could be a satisfactory sun radiation screen and, at the same time, an efficient image combiner.

We claim:

1. A glass windshield for a motor vehicle with combined capabilities of solar radiation screen and image combiner, having a coating on the whole of one of its major surfaces, in which said coating consists essentially of the following sequences of layers: an outer $TiO_2$ or $Al_2O_3$ layer, an inner $Al_2O_3$ or $SiO_2$ layer, one or two metal layers having a thickness from 60 to 300 Å, said metal being selected from the group consisting of silver and aluminum, with the proviso that said metals are different when two metal layers are provided, an additional inner $Al_2O_3$ or $SiO_2$ layer, and an additional outer $TiO_2$ or $Al_2O_3$ layer, all said inner and outer layers having a thickness from 40 to 1500 Å, with the proviso that at least one of said outer and inner layers has a thickness from 300 to 1500 Å, and the further proviso that said inner and outer layers cannot both be $Al_2O_3$.

2. The glass windshield as claimed in claim 1, in which said outer layers have the same thickness and said inner layers have the same thickness.

3. The glass windshield according to claim 1, in which said glass is a laminated glass and said coating is applied between the two sheets of glass which form the laminated glass.

* * * * *